Dec. 24, 1957   J. L. CROWLEY ET AL   2,817,198
BACON PACKING MACHINE
Filed March 4, 1955   8 Sheets-Sheet 1

INVENTORS:
JOHN L. CROWLY.
WILLIAM SWIFT.
ELMER V. LARSEN.
BY
ATTORNEY.

Dec. 24, 1957  J. L. CROWLEY ET AL  2,817,198
BACON PACKING MACHINE

Filed March 4, 1955  8 Sheets-Sheet 2

INVENTORS:
JOHN L. CROWLEY.
WILLIAM SWIFT.
ELMER V. LARSEN.

BY
ATTORNEY.

Dec. 24, 1957  J. L. CROWLEY ET AL  2,817,198
BACON PACKING MACHINE
Filed March 4, 1955  8 Sheets-Sheet 4

INVENTORS:
JOHN L. CROWLEY.
WILLIAM SWIFT.
ELMER V. LARSEN.
BY
ATTORNEY.

Dec. 24, 1957   J. L. CROWLEY ET AL   2,817,198
BACON PACKING MACHINE
Filed March 4, 1955   8 Sheets-Sheet 6

INVENTORS:
JOHN L. CROWLEY.
WILLIAM SWIFT.
ELMER V. LARSEN.
BY
ATTORNEY.

INVENTORS:
JOHN L. CROWLEY.
WILLIAM SWIFT.
ELMER V. LARSEN.

BY

ATTORNEY.

Dec. 24, 1957  J. L. CROWLEY ET AL  2,817,198
BACON PACKING MACHINE
Filed March 4, 1955  8 Sheets-Sheet 8

INVENTORS:
JOHN L. CROWLEY.
WILLIAM SWIFT.
ELMER V. LARSEN.
BY
ATTORNEY.

United States Patent Office 2,817,198
Patented Dec. 24, 1957

2,817,198

BACON PACKING MACHINE

John L. Crowley, William Swift, and Elmer V. Larsen, Omaha, Nebr., assignors to The Cudahy Packing Company Application March 4, 1955, Serial No. 492,278

14 Claims. (Cl. 53—66)

This invention relates to a machine for packing bacon for the retail trade and has for its principal object the provision of a machine constructed and arranged to slice the bacon, form a folded or pleated carrier strip of paper or like material, place individual slices of the bacon between the folds or pleats of the strip, cut off predetermined lengths of the packed strip to provide units of desired weight, such as one pound, and discharge the units from the machine for insertion in an outer wrapper or package.

A more particular object is to provide a machine of this character in which the above-mentioned functions are coordinated and timed in such manner that the pleated paper strip is formed and presented to a packing station with certainty and accuracy for receiving the bacon slices as they are delivered from a slicer so as to avoid waste and time-consuming shut downs.

A further object is to provide adjustable means for controlling the feed of the paper so as to assure a proper ratio and timing of the feed with respect to the operation of the pleating mechanism.

Another object is to provide in such a machine means for perforating the paper strip so that portions thereof on which individual slices of the bacon are placed may be readily torn off by the consumer in the use of the contents of the package.

A still further object is to provide a pleating mechanism which acts upon the paper while the latter is in motion.

These and other objects of our invention are effected in manner which will be apparent from the following description and claims, taken in connection with the accompanying drawings, in which:

Fig. 8 is an enlarged detail view of certain of the mechanism, including the pleating rollers;

Figure 23:
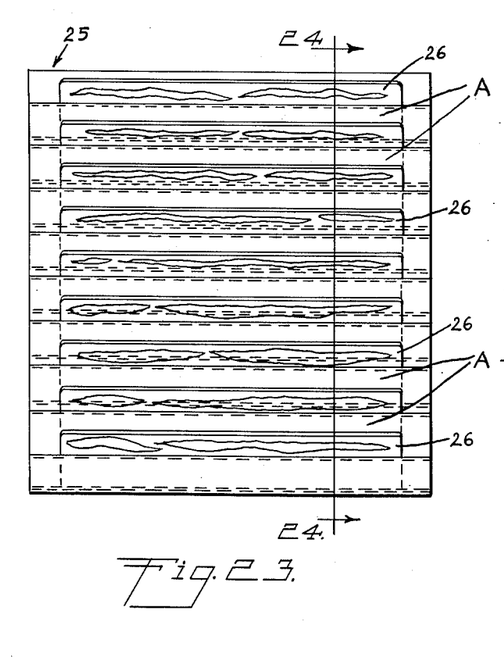
Fig. 23 is a plan view of a number of slices of bacon arranged between the folds of a paper carrier strip by the machine of our invention.
Figure 24:
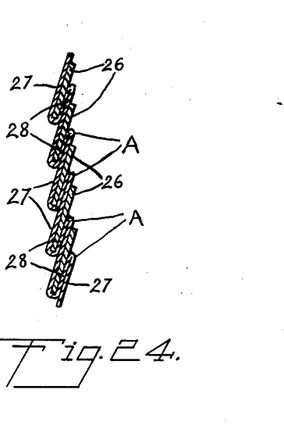
Fig. 24 is a fragment of a section taken along the section line 24—24 in Fig. 23.

Since the purpose of our machine is to produce packs of sliced bacon of the type shown in Figs. 23 and 24 of the drawings, attention is first called to these figures, in which the numeral 25 indicates generally a pack comprising a strip of paper of suitable type and surfacing for receiving slices 26 of bacon between folds 27 and 28 of the paper. It will be noted that the folds 27 are wider than the folds 28 so that a portion of each strip of bacon is visible from the top of the pack as viewed in said Fig. 23. This is what is called a "shingle pack" (or, as designated by the applicant's assignee, a "Pleat-Pac"), which prevents the slices of bacon from sticking together and facilitates withdrawal of individual slices, which can be done by withdrawing an end of the paper strip from the package in which a unit or pack of the bacon, as shown in Fig. 23, is placed. Upon straightening out of the carrier strip 25, the individual slices of bacon are presented in separated relationship and may be lifted off the strip by a fork or spatula and the strip may be torn off along lines of perforations as will later appear. The primary object of our invention, as above indicated, is to provide a machine whereby bacon can be efficiently packed in this manner with the speed required for economical commercial production.

Figures 1, 4:
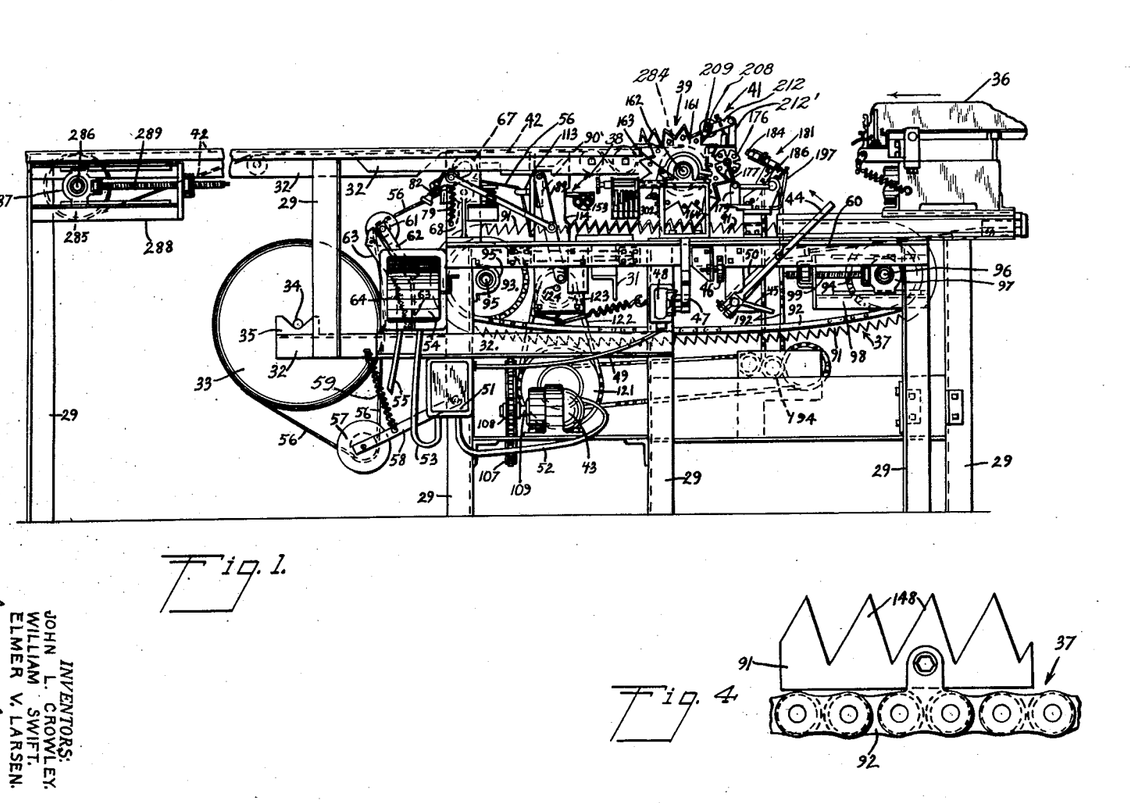
Fig. 1 is a side elevational view of the machine from the operator's side.
Fig. 4 is an enlarged side view of a portion of the female pleating die and the roller conveyor chain to which it is attached.
Figure 2:
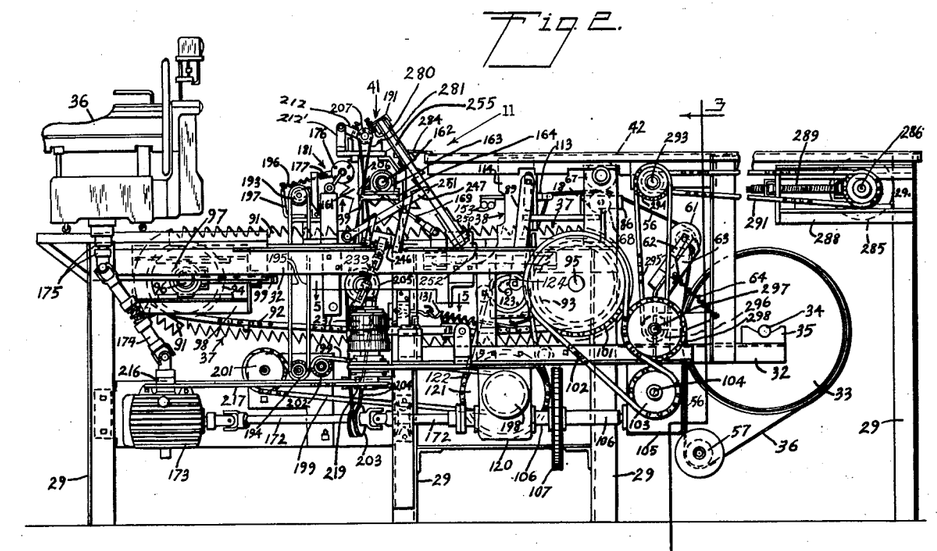
Fig. 2 is a side elevation from the opposite side.
Figure 3:
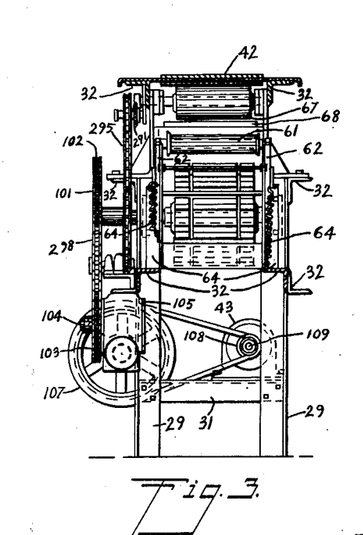
Fig. 3 is a transverse sectional view taken substantially on line 3—3 in Fig. 2.

In the illustrative embodiment of the machine shown in the drawings, the mechanisms for feeding the paper through the machine, pleating it, perforating it, placing the bacon slices in the folds thereof, cutting it off to provide packs of desired size, and delivering the packs from the machine, are mounted upon a frame structure including uprights 29, cross members 31 and longitudinal members 32, shown best in the assembly views of the machine comprising Figs. 1, 2 and 3.

Near one end of the machine a paper supply roll 33 is supported by means of a shaft or spindle 34 upon grooved bearing blocks 35 supported on a pair of the longitudinal frame members 32; and at the other end of the machine a bacon slicer 36, which may be of a conventional or commercial type, is slidably mounted on the frame structure.

Intermediate these elements there is a paper pleating mechanism, including a chain-mounted female die structure generally indicated at 37 (Figs. 1, 2, 4 and 14) and an associated male die structure indicated by the numeral 38 (Figs. 1, 2, 14, 15 and 16); also a star wheel and related elements collectively indicated at 39 (Figs. 1, 2 and 14) by which counted slices of bacon are placed in the folds of the pleated paper; and a paper cut-off mechanism generally identified by the numeral 41 (Figs. 1, 2, 11 and 12).

A conveyor 42, hereinafter more fully described, is employed to deliver the filled packs 25 from the machine.

The machine is driven by a motor 43 (Fig. 1) which is energized when a starting lever 44 is moved by the operator in the direction indicated by the arrow. Said lever 44 has a stop arm 45 thereon which engages an adjustable stop pad 46 (mounted on the frame) at the end of the stroke of the lever. In such movement the lever 44 engages and activates a switch member 47 which coacts with fixed terminals in a switch box 48, the latter being connected through wiring in a cable 49 to a switch box 51 which in turn is connected by wiring in a cable 52 with the motor 43. The switch box 51 is connected by leads in a cable 53 to an entrance switch box 54 which is connected to a source of electrical energy by wiring in a cable 55. A crank arm 50 which is rigid with the lever 44 is connected by a link 60 with the bacon slicer 36. Thus when the lever 44 is moved from the position shown in Fig. 1 to the left to the limit of its stroke it both moves the bacon slicer into its operative position and starts the operation of the packing machine. When the lever 44 is moved back to the position shown in Fig. 1 the switch 47, 48 is opened, thus stopping the machine, and the slicer is returned to the retracted position shown in said Fig. 1.

The paper web, which is identified by the numeral 56, is threaded through the machine and is drawn from the roll 33 by feeding mechanism to be later described. The web passes from said roll 33 around a weighted floating roller 57 carried on an arm 58 (see Fig. 1) which is pivoted to one of the uprights 29 and is connected by a spring 59 to one of the longitudinal frame members 32. This spring counteracts the weight of the roller 57 so that the structure above and hereinafter described provides a proper amount of tension on the web 56.

Figure 10:
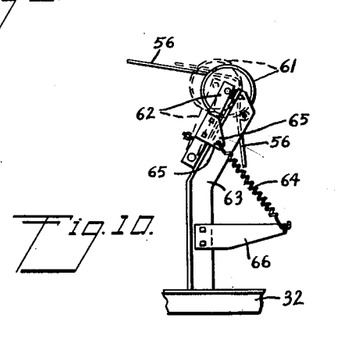
Fig. 10 is an enlarged view of one of the idler rollers over which the web passes.

From the roller 57 the web passes upwardly and over a roller 61 shown at the left of Fig. 1, at the right in Fig. 2 and in detail in Fig. 10. It is also shown in Fig. 3. This roller is carried by two spaced arms 62 pivotally mounted to corresponding brackets 63 which are rigidly secured to frame members 32. Tension springs 64 are connected at one end to lugs 65 on the arms 62 and at the other end to arms 66 on the brackets 63. Said roller 61 thus also provides predetermined amount of tension on the web.

From the roller 61 the web passes upwardly at an angle and between a rubber roller 67 and a steel roller 68 mounted for relative movement in the frame (see Figs. 1, 2, 3, 7, 8 and 9). The roller 67 is carried on a shaft 69, which also carries a clutch and brake assembly 71, including a two-piece eccentric arm 72, 72′ and a brake shoe 73. The arm 72′ is connected at 74 with a feed control arm 75, which is actuated as hereinafter described to rotate the roller 67. The brake shoe 73 is fulcrumed at 76 on one of the uprights 29 and its free end 77 is connected by a rod 78 and tension spring 79 with a fixed point 81 (see Fig. 8) on said upright 29. An adjustment screw 82 having a knurled head 83 thereon extends through a tapped lug 84 on the member 72′ and a lug 85 (not tapped) on the number 72 in which it is rotatably secured, to provide for relative adjustment of these members. Through said clutch mechanism the amount of paper fed between the rollers on each actuation of the arm 75 is controlled to provide a proper ratio and timing of the paper feed with respect to the operation of the paper pleating mechanism to be presently described. The brake shoe 73, which is independent of the clutch numbers 72 and 72′, serves to prevent slippage of the roller 67 in the feeding operation.

Figure 7:
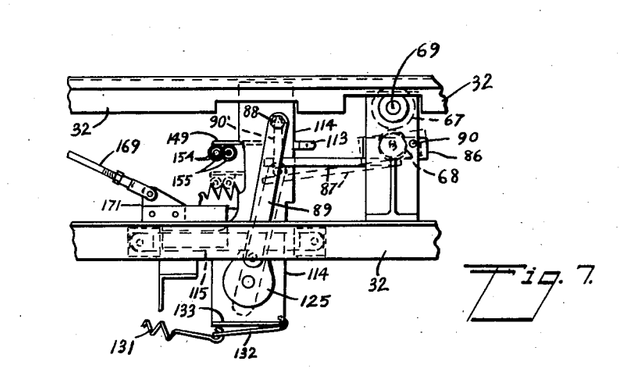
Fig. 7 is an enlarged detail view of the paper feed rollers and the operating means therefor.
Figure 9:
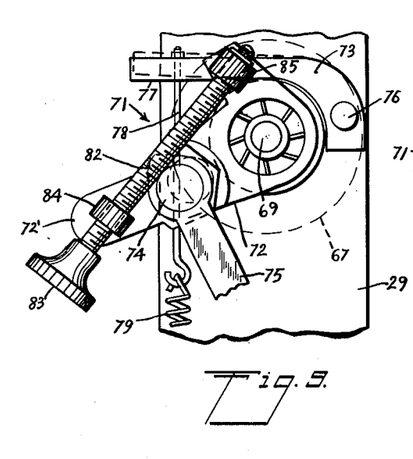
Fig. 9 is an enlarged view of the adjusting mechanism for the paper feed rollers.

The roller 68 is mounted on a carriage 86 which, as best shown in Fig. 7, has an extended arm 87 thereon which is disposed beneath a stud 88 on a crank arm 89 so that on the downward stroke of said arm and stud (effected as later explained) the carriage 86 will be tilted downwardly on its fulcrum 90, as shown in dotted lines in said Fig. 7, to disengage the roller 68 from the roller 67, thus interrupting the feeding of the paper to the pleating mechanism after predetermined downward movement of the arms 89 and 75. A slot 90′ is provided in the carriage 114 to permit vertical movement of the stud 85.

After passing between said rollers 67 and 68, the paper web is delivered to said pleating mechanism, which will now be described (with reference particularly to Figs. 1, 2, 4, 7, 8 and 14–16).

The female die structure 37, previously mentioned and forming a part of the pleating mechanism, comprises a number of toothed pleating pads 91 mounted on a chain 92 taking over sprockets 93 and 94 carried by transverse shafts 95 and 96, respectively. The shaft 95 is journaled in fixed bearing blocks 95′ on the frame and the shaft 96 is supported in blocks 97 that are adjustably mounted in a bracket 98 in which they may be moved longitudinally of the machine by means of an adjusting screw 99.

The sprocket 93 is driven through a sprocket 101 (Fig. 2) on the shaft 95, a chain 102 and a sprocket 103 on a stub shaft 104 protruding from a gear box 105 containing gearing (not shown) that is driven from a shaft 106 carrying a drive sprocket 107 which is chain driven from a sprocket 108 (Fig. 1) on the motor shaft 109.

Figures 14, 15, 16:
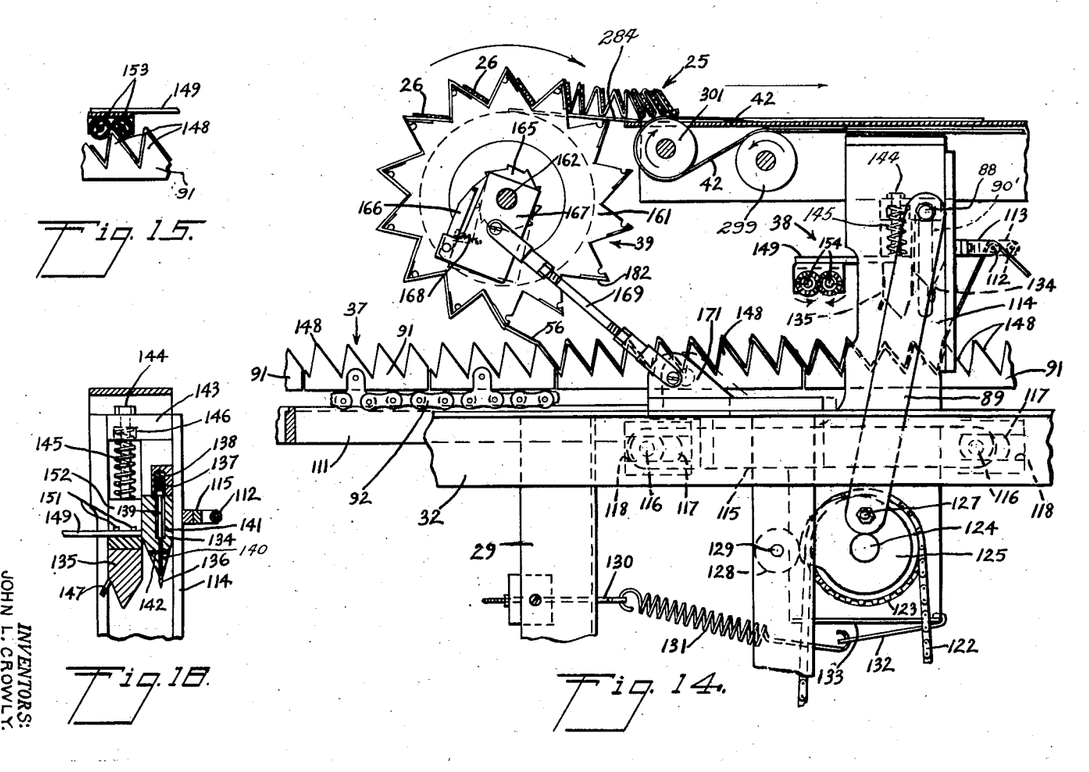
Fig. 14 is an enlarged view of certain of the mechanism, showing the star wheel and the pleating carriage.
Fig. 15 is an enlarged view of a fragment of the female pleating teeth showing the rubber pleating rollers in operative relation thereto.
Fig. 16 is an enlarged view of the male pleating assembly.

The chain 92 travels continuously in clockwise direction (viewing Fig. 1) and the upper reach thereof rides on a track 111 (see Fig. 14).

The web 56 is directed from the rollers 67 and 68 to the female pleating pads 91 on said chain 92 over a roller 112 carried on brackets 113 (Figs. 1, 2, 7, 14 and 16) and is placed upon and conformed to the pleating pads 91 while the latter are traveling horizontally on the track 111. The means for this purpose are mounted on a carriage 114 which is perhaps best shown in Fig. 14. This carriage is supported on a longitudinal frame member 115 having studs 116 at its opposite ends whereby said member is supported from slidable blocks 117 movably positioned in slotted track members 118. The forward position of the carriage 114 and associated mechanism is shown in said Fig. 14.

The carriage and the movable elements carried thereby are actuated from the drive sprocket 107 (Fig. 2) through shaft 106, gearing (not shown) in a gear box 120 from which a stub shaft (not shown) extends transversely of the machine, a sprocket 121 on said stub shaft, a chain 122 trained around said sprocket 121 and a sprocket 123 on a transverse shaft 124 journaled in the frame, a cam 125 carried by said shaft 124 and the crank arm 89 which is secured to said cam 125 by a bolt 127. The cam 125 is held in engagement with an idler roller 128 on a stud 129 on one of the fixed frame uprights 29. Rotation of said cam against the roller 128 thus causes the carriage to move rearwardly from the position shown in Fig. 14. A spring 131, attached at one end to one of the frame uprights 29 by means of an eye-bolt 130 and at the other end (through a strap or link 132) to a base plate 133 on the carriage 114, serves to draw the carriage back to the position of Fig. 14 when the roller 128 is on the low part of the cam 125.

The male pleating die structure, which is shown in detail in Figs. 14–16, is mounted for vertical reciprocation in the carriage 114 and is reciprocated by the crank arm 89 (previously mentioned) which is connected thereto by the stud 88, the latter being vertically movable in the slot 90′.

As best shown in Fig. 16, this structure comprises a pleating tooth 134 and a flanged paper hold-down tooth 135. A creasing plate 136 is slidably mounted in the pleating tooth 134 and is yieldingly held in projected position by springs 137 (one of which is shown) disposed in counterbores 138 in the upper part of the tooth and acting upon said plate 136 through a pin 139 disposed in a bore 141. The plate 136 is slotted at 140 to receive a cross pin 142 which limits its travel.

The hold-down tooth 135 is positioned in advance of the pleating tooth 134 and is supported from an arm 143 in the top part of the carriage 114 by means of a bolt 144 extending through the arm. A spring 145 is positioned on said bolt and bears upon the top of the tooth 135, the upper end of the spring being disposed in a counterbore 146 in the arm 143. Said tooth 135 has a flange 147 thereon and when the assembly is moved downwardly by the crank arm 89, which is secured to the arm 143 at 88, said tooth presses the paper web against the female die pad between two adjacent teeth thereof, the flange 147 engaging over one of said teeth to properly align the male and female die elements and limit the downward stroke of the male element. The pleating tooth 134 then comes down to press the web, which is drawn over the roller 112, into the next space between the teeth, which are identified by the numeral 148. The compression of the spring 145 permits this action, and upon this operation of the creasing plate 136 creases the paper in the bottom of the V between the teeth.

A pair of arms 149 are secured to the holding tooth 135 by means of bolts 151 in a cut-out 152 in the tooth and carry between their ends a pair of rubber rollers 153 mounted on shafts 154. These rollers engage the top of one of the teeth 148 when the pleating assembly is moved down to its lowermost position, as shown in Fig. 15. A pair of meshed gears 155 are provided on the ends of the roller shafts 154 and on the downward stroke of the pleating assembly are turned in opposite directions by means of a rack 156 (Fig. 8) which is held in mesh with said gears by means of a spring 157 extending between a rack arm 158 and the crank arm 89. A tail piece 159 on the arm 158 rests on top of the stud 88. The rollers 153 are rotated by this mechanism to give an additional crease to the pleated paper upon the edge of one of the teeth 148 in advance of the two sets of teeth between which the members 134 and 135, respectively, enter.

It will be understood that the pleating and creasing operations just described are performed while the female die conveyor 37 is in motion, this being permitted by the forward and back motion of the carriage 114 which is accomplished in the manner previously explained.

After leaving the male die structure of the pleating and creasing mechanism, the paper is carried by the conveyor 37 to the star wheel assembly 39, which is shown in detail in Fig. 14.

The star wheel proper is identified by the reference numeral 161 and is mounted on a shaft 162 journaled in bearings 163 on brackets 164 on the frame (see Figs. 1 and 2). The star wheel receives the pleated and creased paper from the conveyor 37, as shown in Fig. 14, and is arranged to be rotated with a step motion by means of a ratchet 165 on said wheel and a pawl 166 pivotally mounted on a plate 167 which is rotatably mounted on the shaft 162. Said pawl 166 is held in mesh with the ratchet 165 by a spring 168 and the plate 167 is arranged to be rotated by means of an arm 169 pivotally connected thereto at one end and pivotally connected at its other end to a slidable bracket 171 which forms a part of the oscillating carriage assembly 114 etc., previously described. The star wheel is thus intermittently rotated by the oscillating action of the pleating carriage and is thereby synchronized with the pleating operation.

The star wheel operation is also synchronized with the action of the bacon slicer 36, which, when the machine is in operation, is moved inwardly from the position shown in Figs. 1 and 2 by the crank 50 and link 60 (Fig. 1) and is driven from the motor 43 through the drive previously described to the gear box 120 and through a section drive shaft 172, gearing in a gear box 173, a flexible shaft 174 and a clutch 175 (see Fig. 2).

The slices of bacon 26 from the slicer are delivered onto the paper on the star wheel at the point that the first slice is shown in Fig. 14.

Figure 17:
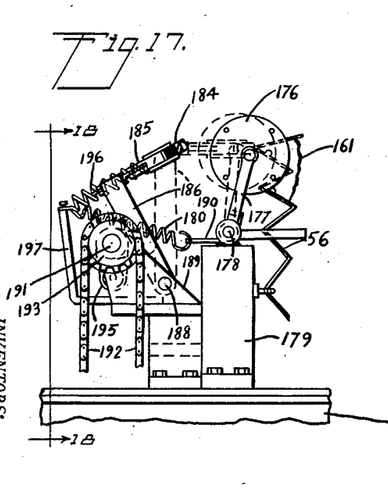
Fig. 17 is an enlarged view of the paper perforator and the squirrel cage paper holder.
Figure 18:
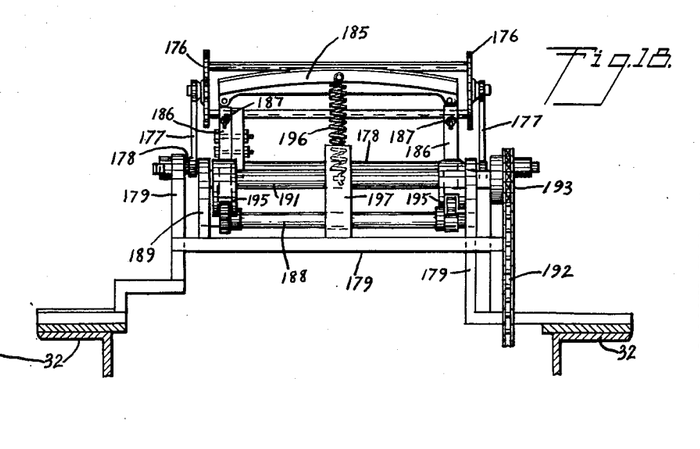
Fig. 18 is an enlarged end view of the parts shown in Fig. 17, being taken on the line 18—18 in that figure.
Figure 19:
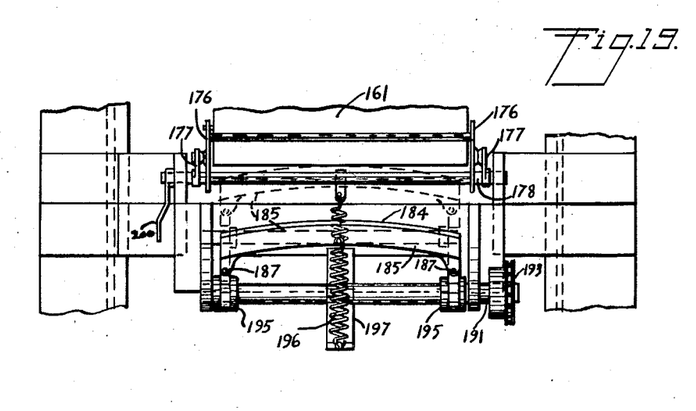
Fig. 19 is an enlarged plan view of the parts shown in Figs. 17 and 18.
Figure 20:
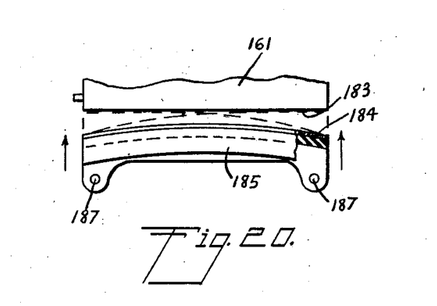
Fig. 20 is an enlarged plan view of the oscillating cam-actuated perforator.

The paper is led up and over the star wheel and is held in position thereon to receive the bacon by means of a squirrel cage type of wheel 176 (Figs. 1 and 2) which is mounted on arms 177 (Figs. 17–19) carried on a shaft 178 journaled in brackets 179 and idles against the teeth of the star wheel, being held thereagainst by a spring 180 which is shown in Fig. 17. A handle 200 is provided for manual movement of the wheel 176 to disengage it from the star wheel, or as may be otherwise required.

As the paper travels over the star wheel it is perforated by a perforating mechanism generally indicated at 181 in Figs. 1 and 2 and shown in detail in Fig. 12 and Figs. 17 to 20, inclusive. This mechanism comprises plates 182 (Figs. 12 and 14) secured to the teeth of the star wheel and having protruding teeth or serrations 183 thereon at the points of the teeth against which the paper is pressed by a rubber pad 184 mounted in an oscillatable arcuate frame 185. Said frame is attached at 187 to arms 186 which are rotatably mounted on a shaft 188 which is supported on the frame by brackets 189 on the base structure 179. A cam shaft 191 is also mounted in said brackets 189 and is rotated by a chain 192 taking over a sprocket 193 on said shaft and over a driving sprocket 194 (see Figs. 1 and 2). On the cam shaft 192 there are two cams 195 which impart oscillating motion to the arms 186, frame 185 and the pad 184. The pad is thus forced against the perforator teeth 183 to perforate the paper so that individual sections thereof can be readily torn off during the use of the contents of the package into which the bacon is ultimately placed.

A return spring 196 connected at one end to the frame 185 and at the other end to a fixed arm 197 on the bracket 179, 189 serves to return the perforator to normal position. The spring 180 is also connected to the arm 197 and extends to an arm 190 on the shaft 178.

The power drive, including the chain 192 and sprockets 193 and 194 previously mentioned, is from a sprocket 198 on a shaft protruding from the gear box 120 by a chain 199 which passes over a sprocket 201, thence around a sprocket on the shaft which carries the sprocket 194 and a sprocket 202 and back to the sprocket 198 (see Fig. 2).

The final operation before the packed units are delivered by the conveyor 42 to the packaging machine is to cut off the paper into predetermined lengths. This is accomplished by the cut-off mechanism heretofore generally identified by the numeral 41.

Figure 5:
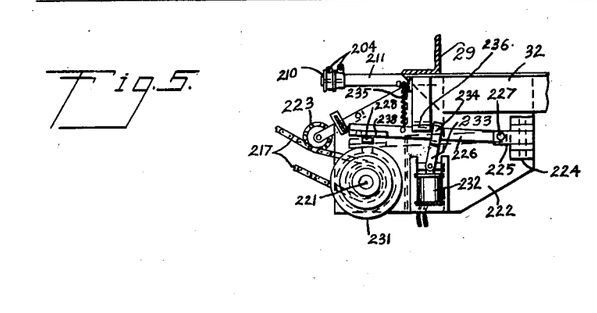
Fig. 5 is a detail plan view of certain of the parts taken substantially along line 5—5 in Fig. 2.
Figure 22:
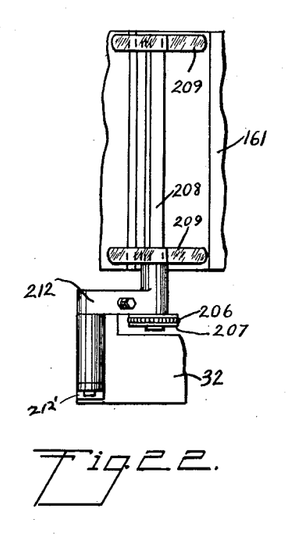
Fig. 22 is an enlarged view of the pressure paper holder.

Preparatory to the cut-off operation the paper is clamped down on a tooth of the star wheel by a mechanism operated from the shaft 172 (see Fig. 2) through a pulley 203, a belt 204 held in place by an idler pulley 210 on a shaft 211 (see Fig. 5), a pulley 205, a second pulley (not shown) on the shaft that carries said pulley 205, a spring belt 206 and a pulley 207 (see also Fig. 22). Said pulley 207 is mounted on a square shaft 208 to which a pair of flat paper holders 209 are attached. These holders successively press a vertical pleat of the paper against a tooth on the star wheel 161. Said shaft 208 is supported in a frame bracket comprising an adjustable arm 212 and an upright 212' supported from one of the frame members 32 (see Fig. 22).

Figure 6:
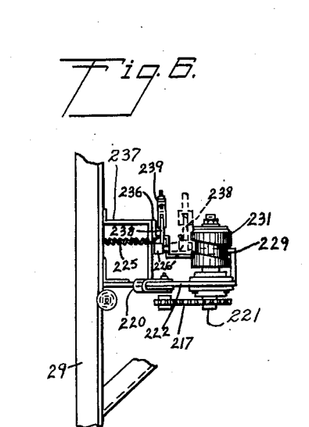
Fig. 6 is an end view of the parts shown in Fig. 5, taken from the left end thereof.
Figures 11, 12, 13:
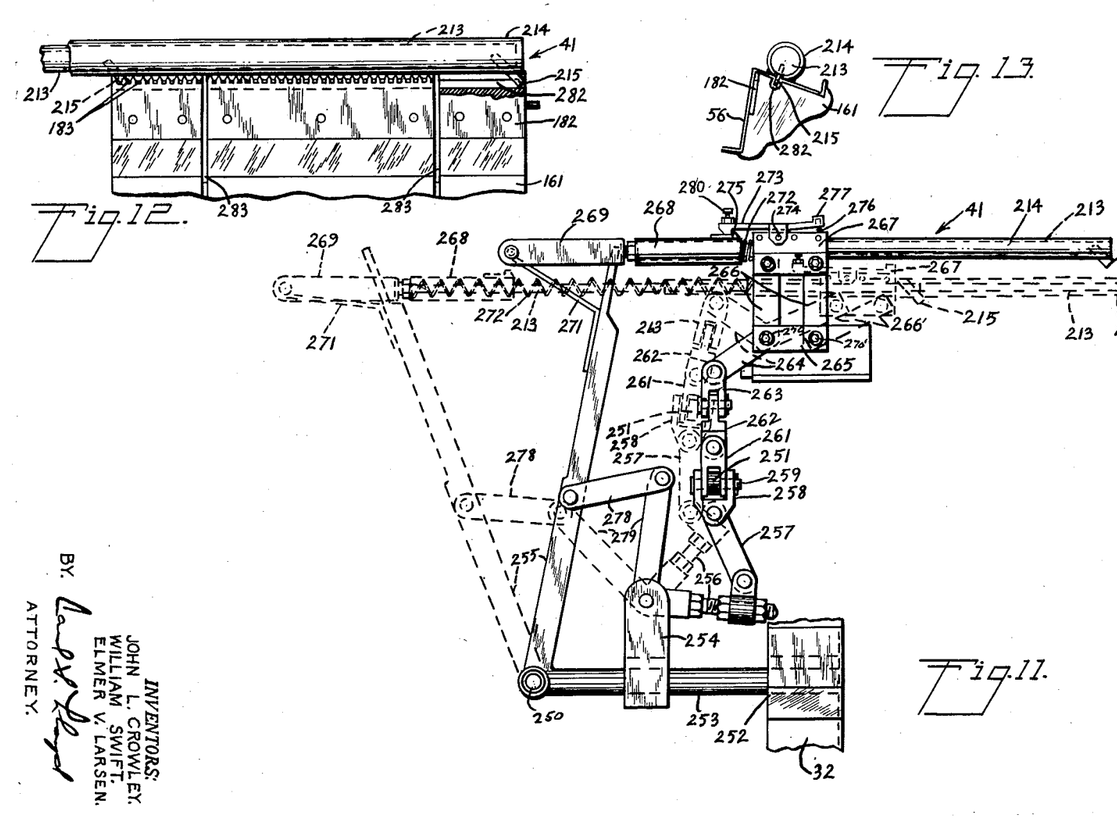
Fig. 11 is an enlarged view of the paper cutting knife shown in two different positions, being taken from the angle indicated by the arrow marked 11 in Fig. 2.
Fig. 12 is an enlarged view of one of the star wheel teeth, showing the paper perforating edge thereon.
Fig. 13 is an enlarged end view of one of the grooved star wheel teeth showing the paper cutting knife mounted adjacent thereto.

The cutter comprises a slidable rod 213 mounted in a tube 214 and having a knife 215 thereon (see Figs. 11–13). It is operated by a train of mechanism deriving power from a vertical shaft 216 arising from the gear box 173 (see Fig. 2). A chain 217 travels over a sprocket (not visible) on said shaft 216 and a sprocket 219 on the lower end of a vertical drum shaft 221 supported in a base plate 222 (see Figs. 5, 6 and 21) which is supported from one of the uprights 29 by a bracket 220. An adjustable idler sprocket 223 is mounted on the base plate 222 and holds the chain 217 taut. On an upright 224 on the base plate 222 there is a short vertically pivotable arm 225 (Fig. 21), and a horizontally disposed arm 226 is pivoted by a pin 227 to said arm 225. A cam-engaging roller 228 is carried at the end of the arm 226 and rides in a cam track 229 (best shown in Fig. 6) in a drum cam 231 on the shaft 221.

Engagement of the roller 228 with the cam track 229 in the drum cam 231 is effected by a solenoid 232 (Fig. 5), the armature 233 of which is connected to the arm 226 by a strap 234. When the solenoid is deenergized, disengagement of the roller from the cam is effected by a spring 235 connected at one end to the arm 226 and at the other end to the nearest frame member 29. Said spring moves the arm 226 to a locked position under a plate 236 (Figs. 5, 6 and 21) attached to an angle bracket 237 which is secured to the plate 222 and to the upright 29. By reason of being vertically as well as horizontally pivoted, the arm 226 is raised and lowered by the rotation of the drum cam 231 and is moved horizontally into and out of engagement with the drum.

Figure 21:
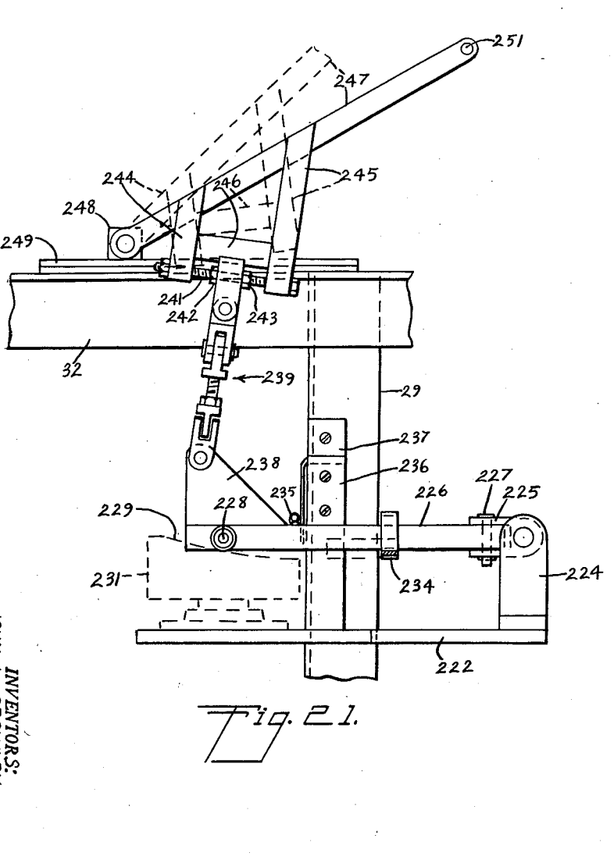
Fig. 21 is an enlarged view of the stroke adjustment arm for the paper cutting knife.

A lug 238 is attached to the arm 226 and is connected by a jointed link 239 (see particularly Fig. 21) with a stroke adjustment mechanism for the paper cutter, which mechanism includes a threaded bolt 241, adjusting nuts 242 and 243 on said bolt, bracket arms 244 and 245, also carried by the bolt and having a cross-piece 246 therebetween, and an arm 247 pivoted on lugs 248 on an anchoring base 249 in one of the horizontal beams 32. Adjustment of the nuts 242 and 243 on the bolt 241 controls the length of the stroke of the paper cutting knife 214 which is illustrated in Fig. 11, movement of the units to the left (as shown in Fig. 21) lengthening the stroke and movement to the right shortening it.

Rotation of the drum cam 231 raises and lowers the pivoted arm 247 through the mechanism just described, and this arm is pivotally connected at 251 with the paper cutting mechanism (as best shown in Fig. 11). The latter mechanism comprises the tube 214, rod 213, and knife 215 previously mentioned and also the actuating means therefor which are shown in Fig. 21.

Said actuating means include linkage which is supported from one of the horizontal frame members 32 by an anchoring pad 252 and a rod 253 which has a lug 254 fixedly secured thereto and an arm 255 pivoted at 250 to the outer end thereof. This arm 255 is shown in end elevation in Fig. 2 but the other mechanism shown in Fig. 11 is not visible in this figure, being disposed behind this arm and in a diagonal transverse plane as indicated by the arrow and the numeral 11 in said Fig. 2.

A lever 256 is pivoted to the lug 254 on the rod 253 as shown in Fig. 11 and is connected by a link 257 with a clevis 258, to which the arm 247 (Fig. 21) is pivotally connected at 251 by a bolt 259. A bifurcated arm 261 is pivotally mounted on said bolt 259 and is connected by pivotally joined members 262 and 263 with an arm 264 which is rigid with a member 266 that is fulcrumed at 270 to a fixed frame member 265. A link 266' is also fulcrumed (at 270') on the frame member 265 and said members 266 and 266' are pivotally connected with a supporting member 267 in which the tube 214 is carried.

At the left of said tube 214 (viewing Fig. 11) is a shorter tube 268 into which the rod 213 also extends. The left end of said rod is connected with an end-piece 269 which is pivotally connected with a bracket 271 on the arm 255. A compression spring 272 is mounted on the left end of the rod 213 and, when compressed, the greater part thereof is contained within the tube 268.

A locking latch 273 is pivoted at 274 to the bracket 267 and is normally held in engagement with a detent 275 on the tube 268 by a spring 276 extending between the bracket 267 and a tail piece 277 on said latch 273. An adjustable threaded bolt 280 extends through a side extension (not shown in Fig. 11) of the latch member 273 and is arranged to engage a pad 281 (see Fig. 2) on the frame to release the latch at a point in the cycle of operation to be presently mentioned.

The arm 255 is connected by a link 278 and a lever 279 with the lug 254 on the rod 253.

When the arm 247 is raised by the mechanism shown in Fig. 21, the parts of the linkage 257—267 assume the dotted line position shown in Fig. 11, the cutter mechanism being moved down and to the extreme right hand position shown in said Fig. 11. At or near the end of the stroke the bolt 280 engages the pad 281 and releases the latch 273. The spring 272 thereupon expands, moving the members 269, 255, etc. and the rod 213 to the left hand position shown in dotted lines in Fig. 11. In this action the knife 215 is drawn through the paper, clearance therefor being provided by a transverse groove 282 in the star wheel teeth (see Figs. 12, 13 and 14). The star wheel also has two circular grooves 283 therein in which stripper fingers 284 are located (Figs. 2 and 14). Further rotation of the drum cam 231 pulls down on the linkage shown in Fig. 11 (through the connection 251) and restores the mechanism to normal position ready for the next cutting operation.

A counter 302 of conventional construction is provided for counting the bacon slices and controlling the paper cut-off mechanism by causing energization (through electrical connections not shown) of the solenoid 232 (Fig. 5) when a predetermined number of bacon slices have been placed on the pleated paper.

The filled and severed packs or units are delivered from the machine to a packaging machine by the conveyor 42 previously mentioned. This conveyor is driven by an adjustable pulley 285 (see Figs. 1 and 2) mounted on a shaft 286 in bearings 287 in a frame bracket 288 and arranged for adjustment lengthwise of the machine by means of adjusting screws 289. The pulley 285 is driven by a chain-and-sprocket drive comprising a chain 291 passing over a sprocket 292 on the shaft 286 and a sprocket (not shown) on a shaft 293 which also carries a sprocket 294 that is driven by a chain 295 extending over a sprocket 296 on a shaft 297 that also carries a larger sprocket 298 which is driven by a chain 102 by which the sprocket 93 of the female die conveyor 37 is driven. The inner end of the conveyor belt 52 passes over rollers 299 and 301 which turn in the direction of the arrows shown in Fig. 14.

While we have shown our invention in but one form, it will be obvious that it is not so limited but is susceptible of various changes and modifications within the scope of the appended claims. It will also be evident that bacon has been referred to throughout as the food product with which the invention is concerned, it may well be adaptable also to the packing of other sliced food products, such as other types of meat products, and the references to bacon are therefore meant to be illustrative rather than limiting.

We claim:

1. A machine for packing sliced bacon in pleated carrier strips comprising: a stepped rotary member; mechanism for feeding a continuous web of carrier-strip material through the machine and over said rotary member; devices operable in timed relation to said feeding mechanism for pleating said web; means synchronized with said feeding mechanism and said rotary member for delivering slices of bacon onto the pleated web on the steps of said member; means whereby the pleated web with the slices of bacon thereon is taken off said rotary member with the pleats interfolded and the bacon slices arranged individually between the folds of the web; cut-off mechanism controlled by the delivery of the bacon onto the carrier strip on the steps of said rotary member for cutting off strips of the pleated web, each containing a predetermined quantity of bacon, to form packs of desired unit size; and conveyor means for delivering said packs from the machine for subsequent packaging.

2. A machine for packing sliced bacon in pleated carrier strips comprising: a star wheel; mechanism for feeding a web of carrier-strip material through the machine and over said star wheel; devices operable in timed relation to said feeding mechanism for pleating said web; means for delivering slices of bacon onto the pleated web on the teeth of said star wheel; means whereby the pleated web with the slices of bacon thereon is taken off said star wheel with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

3. A machine for packing sliced bacon in pleated carrier strips comprising: a stepped rotary member; mechanism for feeding a web of carrier-strip material through the machine and over said rotary member; devices operable in timed relation to said feeding mechanism for pleating said web; adjustable means for varying the web feed to assure proper ratio and timing with respect to the pleating operation; means for delivering slices of bacon onto the pleated web on the steps of said member; means whereby the pleated web with the slices of bacon thereon is taken off said rotary member with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

4. A machine for packing sliced bacon in pleated carrier strips comprising: a stepped rotary member; mechanism for feeding a web of carrier-strip material through the machine and over said rotary member; devices operable in timed relation to said feeding mechanism for pleating said web, said devices being movable into and out of engagement with the web and also in the direction of linear movement of the web whereby the pleating operation takes place while the web is in motion; means for delivering slices of bacon onto the pleated web on the steps of said member; means whereby the pleated web with the slices of bacon thereon is taken off said rotary member with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

5. A machine for packing sliced bacon in pleated carrier strips comprising: a stepped rotary member; mechanism for feeding a web of carrier-strip material through the machine and over said rotary member; devices operable in timed relation to said feeding mechanism for pleating said web; mechanism coordinated with said web feeding mechanism and pleating devices for perforating the web at lines of fold formed by said devices; means for delivering slices of bacon onto the pleated web on the steps of said member; means whereby the pleated web with the slices of bacon thereon is taken off said rotary member with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

6. A machine for packing sliced bacon in pleated carrier strips comprising: a stepped rotary member; mechanism for feeding a web of carrier-strip material through the machine and over said rotary member; devices operable in timed relation to said feeding mechanism for pleating said web; means for delivering slices of bacon onto the pleated web on the steps of said member; means whereby the pleated web with the slices of bacon thereon is taken off said rotary member with the pleats interfolded and the bacon slices arranged individually between the folds of the web; a slice counter; cut-off mechanism controlled by said counter for cutting off strips of the pleated web, each containing a predetermined quantity of bacon, to form packs of desired unit size; and conveyor means for delivering said packs from the machine for subsequent packaging.

7. A machine for packing sliced bacon in pleated carrier strips comprising: a stepped rotary member; mechanism for feeding a web of carrier-strip material through the machine and over said rotary member; devices operable in timed relation to said feeding mechanism for pleating said web; a bacon slicer for slicing the bacon and delivering the slices onto the pleated web on the steps of said member; power means for operating the machine, including a starting lever; connections between said lever and said bacon slicer whereby the latter is moved into operative position by movement of said lever to machine-starting position; means whereby the pleated web with the slices of bacon thereon is taken off said rotary member with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

8. A machine for packing a sliced product in pleated carrier strips comprising: a stepped rotary member; mechanism for feeding a web of carrier-strip material through the machine and over said rotary member; devices operable in timed relation to said feeding mechanism for pleating said web; means for delivering slices of the food product onto the pleated web on the steps of said member; means whereby the pleated web with the slices of the food product thereon is taken off said rotary member with the pleats interfolded and the slices arranged individually between the folds of the web; cut-off mechanism controlled by the delivery of the food product for cutting off strips of the pleated web, each containing a predetermined quantity of the food product, to form packs of desired unit size; and conveyor means for delivering said packs from the machine for subsequent packaging.

9. A machine for packing sliced bacon in pleated carrier strips comprising: a stepped rotary member; mechanism for feeding a web of carrier-strip material through the machine and over said rotary member; devices operable in timed relation to said feeding mechanism for pleating said web; means for delivering slices of bacon onto the pleated web on the steps of said member; means whereby the pleated web with the slices of bacon thereon is taken off said rotary member with the pleats interfolded and the bacon strips arranged individually between the folds of the web; cut-off mechanism controlled by the delivery of the bacon for cutting off strips of the pleated web, each containing a predetermined quantity of bacon, to form packs of desired unit size, said mechanism including a reciprocable knife, a latch for holding the same normally in inoperative position and trip means comprising cam elements, linkage between the same and said latch for causing release of the latter, and electrical means controlled by the bacon delivery for bringing said cam elements into operative relationship to cause operation of said knife when a predetermined quantity of the bacon has been placed on the web; and conveyor means for delivering said packs from the machine for subsequent packaging.

10. A machine for packing sliced bacon in pleated carrier strips comprising: a stepped rotary member; mechanism for feeding a web of carrier strip material through the machine and over said rotary member, said mechanism including an adjustable clutch for controlling the rate of feed; devices operable in timed relation to said feeding mechanism for pleating said web; means for delivering slices of bacon onto the pleated web on the steps of said member; means whereby the pleated web with the slices of bacon thereon is taken off said rotary member with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

11. A machine for packing sliced bacon in pleated carrier strips comprising: a stepped rotary member; mechanism for feeding a web of carrier strip material through the machine and over said rotary member; devices operable in timed relation to said feeding mechanism for pleating said web, said devices including male and female die elements, a pleating tooth carried by the male element and means for moving said tooth into and out of engagement with the web upon said female die element to crease the web at spaced intervals; means for delivering slices of bacon onto the pleated web on the steps of said member; means whereby the pleated web with the slices of bacon thereon is taken off said rotary member with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

12. A machine for packing sliced bacon in pleated carrier strips comprising: a stepped rotary member; mechanism for feeding a web of carrier strip material through the machine and over said rotary member; devices operable in timed relation to said feeding mechanism for pleating said web, said devices including male and female die elements, the latter having teeth thereon, a pair of rollers carried by said male element and movable into and out of engagement with the web on said female element, and means for rotating said rollers to crease the web upon successive teeth of said female element; means for delivering slices of bacon onto the pleated web on the steps of said member; means whereby the pleated web with the slices of bacon thereon is taken off said rotary member with the pleats interfolded and the bacon slices arranged individually between the folds of the web; cut-off mechanism controlled by the delivery of the bacon for cutting off strips of the pleated web, each containing a predetermined quantity of bacon, to form packs of desired unit size; and conveyor means for delivering said packs from the machine for subsequent packaging.

13. A machine for packing sliced bacon or the like in pleated carrier strips in a shingle-pack formation comprising: a stepped rotary member; mechanism for feeding a continuous pleated web of carrier-strip material over said rotary member; means synchronized with said feeding mechanism and said rotary member for depositing individual strips of the bacon on the web between lines of fold forming the pleats therein; cut-off mechanism controlled by the delivery of the bacon onto the carrier strip on the steps of said rotary member for cutting the web to form filled pleated packs of predetermined size; and means for discharging said packs from the machine.

14. A machine for packing sliced bacon or the like in pleated carrier strips in a shingle-pack formation comprising: a stepped rotary member; mechanism for feeding a continuous pleated web of carrier-strip material over said member; means synchronized with said feeding mechanism and said rotary member for depositing individual strips of the bacon on the web between lines of fold forming the pleats therein; a perforator operable in timed relationship to said feeding mechanism and depositing means to perforate the web on lines of fold between the bacon strips; cut-off mechanism controlled by the delivery of the bacon onto the carrier strip on the steps of said rotary member for cutting the web to form filled pleated packs of predetermined size; and means for discharging said packs from the machine.

References Cited in the file of this patent

UNITED STATES PATENTS

| 1,976,211 | Bickford | Oct. 9, 1934 |
| 2,344,022 | Brawn | Mar. 14, 1944 |
| 2,372,072 | Flaws | Mar. 20, 1945 |
| 2,661,946 | Chambon | Dec. 8, 1953 |

FOREIGN PATENTS

| 412,832 | Great Britain | July 5, 1934 |